United States Patent
Hiroike (10) Patent No.: US 9,082,168 B2
(45) Date of Patent: Jul. 14, 2015

(54) RADIATION IMAGING APPARATUS, RADIATION IMAGE PROCESSING APPARATUS, AND IMAGE PROCESSING METHOD

(71) Applicant: CANON KABUSHIKI KAISHA, Tokyo (JP)

(72) Inventor: Taro Hiroike, Yamato (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 84 days.

(21) Appl. No.: 13/895,589

(22) Filed: May 16, 2013

(65) Prior Publication Data

US 2013/0329981 A1 Dec. 12, 2013

(30) Foreign Application Priority Data

Jun. 11, 2012 (JP) .................................. 2012-132366

(51) Int. Cl.
*G06T 7/00* (2006.01)
*G06T 5/00* (2006.01)
*G06T 5/50* (2006.01)

(52) U.S. Cl.
CPC ............... *G06T 7/0012* (2013.01); *G06T 5/002* (2013.01); *G06T 5/50* (2013.01); *G06T 2207/10016* (2013.01); *G06T 2207/10116* (2013.01); *G06T 2207/30004* (2013.01)

(58) Field of Classification Search
USPC ......... 382/100, 128, 130, 131, 132, 181, 190, 382/195, 254–275; 128/922; 378/4–27
See application file for complete search history.

(56) References Cited

U.S. PATENT DOCUMENTS

| | | | |
|---|---|---|---|
| 7,095,039 B2 * | 8/2006 | Murakoshi | 250/591 |
| 7,170,064 B2 * | 1/2007 | Ohara | 250/370.11 |
| 7,203,279 B2 * | 4/2007 | Fujii et al. | 378/116 |
| 7,394,925 B2 * | 7/2008 | Hayashida | 382/132 |
| 7,822,178 B2 * | 10/2010 | Enomoto | 378/91 |
| 2004/0252874 A1 * | 12/2004 | Yamazaki | 382/132 |
| 2005/0238249 A1 * | 10/2005 | Okamura | 382/274 |
| 2008/0231734 A1 * | 9/2008 | Enomoto | 348/246 |
| 2009/0238330 A1 * | 9/2009 | Luhta et al. | 378/19 |

FOREIGN PATENT DOCUMENTS

| | | |
|---|---|---|
| JP | 2008-310466 | 12/2008 |
| JP | 2010-233963 | 10/2010 |

\* cited by examiner

*Primary Examiner* — Anand Bhatnagar
(74) *Attorney, Agent, or Firm* — Fitzpatrick, Cella, Harper & Scinto

(57) ABSTRACT

Provided is a technique to improve both the image quality of a radiation image and the operability of a radiation imaging apparatus. In the present invention, three or more unirradiated images are obtained before capturing a radiation image, and a temporal change in the amount of electric charges in each pixel is approximated using a non-linear function. At this time, the amount of residual electric charges is determined by evaluating a coefficient of determination of an approximate equation, and the most appropriate offset correction processing method is selected in accordance with the status of the determination.

16 Claims, 4 Drawing Sheets

RADIATION IMAGING APPARATUS, RADIATION IMAGE PROCESSING APPARATUS, AND IMAGE PROCESSING METHOD

BACKGROUND OF THE INVENTION

1. Field of the Invention

The present invention relates to a radiation imaging apparatus that captures radiation images such as digital X-ray images, a radiation image processing apparatus, and an image processing method. In particular, the present invention relates to an offset correction technique of the radiation imaging apparatus.

2. Description of the Related Art

In recent years, as radiation imaging apparatuses for capturing radiation images such as images of X-rays transmitted through an object, radiation imaging apparatuses that directly convert a radiation image into digital signals in real time have become widespread. Especially, in order to examine the inside of a relatively large object such as a human body, large-area flat panel detectors (FPD) have been proposed. For example, an FPD is known in which minute radiation detectors are arrayed in a matrix on a substrate made of fused quartz. The radiation detectors are formed by layering a solid-state photodetector and a scintillator that converts radiation into visible light. The solid-state photodetector includes an amorphous semiconductor sandwiched between a transparent conductive film and a conductive film.

A radiation detector that uses a CCD or CMOS detector as a solid-state photodetector is also known. A radiation detector that directly detects radiation with a solid-state photodetector without using a scintillator is known as well.

Such FPDs detect the dose of radiation emitted during an arbitrary accumulation time period as the amount of electric charges. Therefore, in the case where electric charges that have no relevance to the emission of radiation exist in the detectors when capturing a radiation image, these electric charges are superimposed on the radiation image as noise and may trigger a decrease in the image quality of the radiation image. Examples of such electric charges that exist in the detectors and have no relevance to the emission of radiation include residual electric charges that remain after capturing a preceding radiation image based on the characteristics of the scintillators and solid-state photodetectors. Dark current, which is based on the electric charges generated mainly by the influence of temperature, may also occur in the solid-state photodetectors. Furthermore, there is fixed noise caused by defects unique to the solid-state photodetectors. When capturing a radiation image, residual electric charges and electric charges including dark current components increase in proportion to the accumulation time period for accumulating electric charges, and therefore the image quality is decreased. For this reason, upon capturing a radiation image, offset correction processing is executed to remove offset components that are attributed to residual electric charges and dark current electric charges accumulated during the image capture and to fixed noise.

In typical offset correction processing, an image obtained without emitting radiation (hereinafter referred to as an unirradiated image) is used as an offset correction image, and this offset correction image is subtracted from a radiation image. It should be noted here that an unirradiated image, which is obtained without emitting radiation as stated above, is typically obtained immediately before or immediately after capturing a radiation image. When it is necessary to obtain radiation images at high speed in succession as in the case of, for example, video capture, an offset correction image that has been prepared in advance may be used as it is difficult to obtain an unirradiated image between the operations of capturing the radiation images.

However, in typical FPDs, dark current electric charges are often unstable immediately after starting the driving of the detectors and immediately after emitting radiation. Also, residual electric charges that occur after the emission of radiation are known to change more drastically immediately after the emission of radiation is finished. Therefore, in order to execute stable offset correction processing, it is necessary to secure a certain time period between the start of the driving of the detectors and the image capture for a radiation image, or between the image capture for a preceding radiation image and the image capture for the next radiation image.

Furthermore, the use of an offset correction image that has been prepared in advance often fails to achieve adequate correction accuracy because dark current electric charges change due to the influence of, for example, the temperature of the detectors, imaging conditions, and deterioration of sensors over time.

Meanwhile, in order to improve the operability of radiation imaging apparatuses, it is desired that the radiation imaging apparatuses be capable of capturing the next radiation image as quickly as possible immediately after starting the driving and immediately after capturing a radiation image.

To achieve this object, Japanese Patent Laid-Open No. 2008-310466 discloses a technique to prepare a correction table showing the characteristics of decays of residual electric charges in association with imaging conditions and elapsed time periods, correct an offset correction image based on the correction table in association with imaging conditions and elapsed time periods, and use the corrected offset correction image. On the other hand, Japanese Patent Laid-Open No. 2010-233963 discloses a method for capturing a plurality of unirradiated images within a certain time period after a radiation emission start button is pressed down, and generating an offset correction image by fitting a temporal change in pixel values thereof using an approximate equation.

However, in the case where offset correction processing is executed based on the characteristics of decays that have been prepared in advance as disclosed in Japanese Patent Laid-Open No. 2008-310466, it is necessary to monitor the temperature during the image capture or similar statuses, and hence to set a new configuration therefor. Furthermore, when imaging conditions such as the temperature and the accumulation time period have changed since when the characteristics of decays were obtained in advance, it is necessary to generate an offset correction image through interpolation. This makes a decrease in correction accuracy unavoidable. Moreover, when the characteristics of decays in the detectors change over time, correction accuracy decreases significantly.

In view of the above, in order to improve the image quality of a radiation image, it is desired to generate a highly accurate offset correction image regardless of a time period that has elapsed since the start of the driving of the detectors, a time period that has elapsed since the last emission of radiation, and the amounts of residual electric charges and dark current electric charges.

Meanwhile, with regard to a method for calculating the characteristics of decays using a plurality of unirradiated images, which is disclosed in Japanese Patent Laid-Open No. 2010-233963, correction accuracy is maintained as long as a certain approximate equation holds. However, when the characteristics of decays are complex, a large number of unirradiated images are necessary to obtain a highly accurate approximate equation. As a result, a longer time period is required to perform the next image capture, thereby reducing the operability of radiation imaging apparatuses. Furthermore, as a temporal change in residual electric charges is influenced by the dose of radiation itself, it is difficult to apply the same approximate equation to, for example, pixels irradiated with a large dose of radiation and pixels irradiated with a small dose of radiation in an immediately preceding image capture. While Japanese Patent Laid-Open No. 2010-233963 also discloses a method whereby a plurality of approximate equations are applied and one of the approximate equations that yields the appropriate result is used, this method requires more arithmetic operations. As a result, due to various time delays, a further reduction in the operability of radiation imaging apparatuses is unavoidable.

For this reason, in the case where an offset correction image is generated using an approximate equation, it is desired to improve the operability of radiation imaging apparatuses by reducing the interval of image capture.

SUMMARY OF THE INVENTION

The present invention has been made in view of the above problem.

A radiation imaging apparatus according to the present invention has, for example, the following configuration: a radiation imaging apparatus includes an image detection unit and an image processing unit. The image detection unit includes a plurality of radiation detection elements that generate electric charges in accordance with a dose of radiation transmitted through an object. The image processing unit processes a radiation image detected by the image detection unit, and includes: a correction image generation unit that generates, based on a plurality of unirradiated images that are obtained in succession by the image detection unit while radiation is not emitted, a correction image for a radiation image that is obtained at an arbitrary timing after the plurality of unirradiated images are obtained; and a correction unit that corrects the radiation image using the correction image. The correction image generation unit applies non-linear approximation to a temporal change in signal intensities of the plurality of unirradiated images in units of the plurality of radiation detection elements, and switches between methods for generating a correction image in accordance with a coefficient of determination of an obtained approximate equation.

The present invention can improve both the image quality of a radiation image and the operability of a radiation imaging apparatus.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described in detail in accordance with the accompanying drawings.

While the following embodiment provides an example in which X-rays are used as radiation, the present invention is not limited in this way. Alternatively, radiation other than X-rays, such as $\alpha$ radiation, $\beta$ radiation and $\gamma$ radiation, and other electromagnetic waves may be used.

First Embodiment

1. Configurations of Radiation Imaging System

Figure 1:
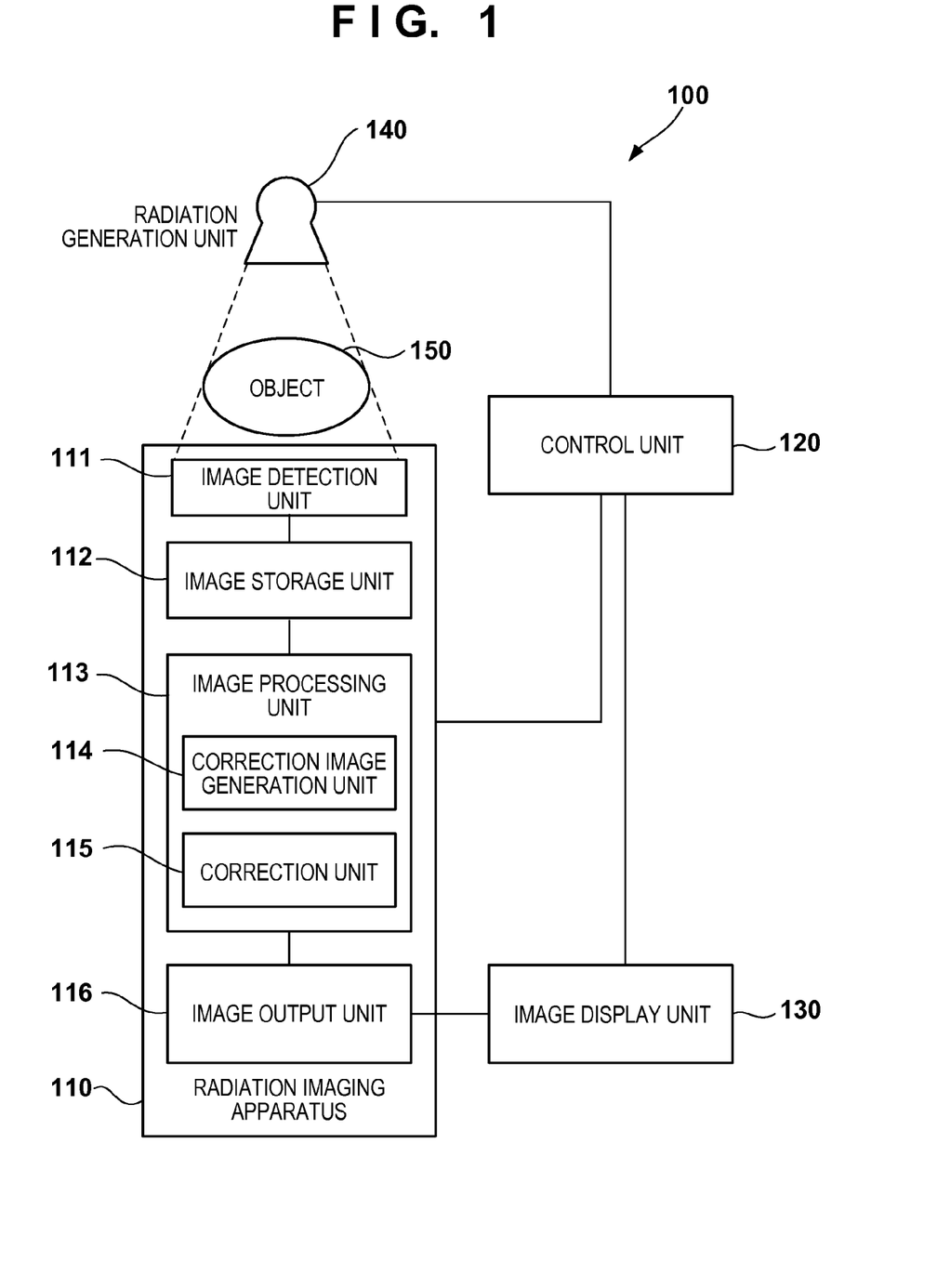
FIG. 1 shows one example of a radiation imaging system including a radiation imaging apparatus according to one embodiment of the present invention.

FIG. 1 shows exemplary configurations of a radiation imaging system 100 including a radiation imaging apparatus 110 according to one embodiment of the present invention. The radiation imaging apparatus 110 includes an image detection unit 111, an image storage unit 112, an image processing unit 113, and an image output unit 116.

The image detection unit (e.g., FPD) 111 detects radiation that has been emitted by a radiation generation unit 140 and transmitted through an object 150. The image detection unit 111 is formed by arraying a plurality of radiation detection elements that generate electric charges in accordance with the dose of emitted radiation. The image storage unit 112, which can store a plurality of images, stores images (radiation images and unirradiated images) detected by the image detection unit 111. Note that the image storage unit 112 may be provided in the radiation imaging apparatus 110, or may be provided in a storage unit (e.g., a memory and a hard disk drive) in an externally connected computer.

The image processing unit 113 includes a correction image generation unit 114 and a correction unit 115. The correction image generation unit 114 generates an offset correction image from unirradiated images stored in the image storage unit 112. The correction unit 115 applies predetermined offset correction processing to a radiation image using the generated offset correction image. The correction unit 115 also applies other image processing to the radiation image. Note that the image processing unit 113 may be configured using hardware, or may be configured using a program for causing a computer to execute an image processing method according to the present invention. Specifics of the image processing method will be described later.

The image output unit 116 has a function of outputting the radiation image processed by the image processing unit 113. The radiation image may be output, for example, to an image display unit 130 represented by various types of displays, to a printer that outputs a printed image of the radiation image (not shown in the figures), and to a storage device (e.g., a hard disk drive) for storing the radiation image (not shown in the figures).

A control unit 120 controls the operations of the entire system. For example, the control unit 120 includes one or more computers and controls the radiation generation unit 140 and the radiation imaging apparatus 110. The computer (s) may include input/output units such as a keyboard, mouse and display. The display may serve as the image display unit 130.

While this concludes a description of exemplary configurations of the radiation imaging system 100 including the radiation imaging apparatus 110 according to the present embodiment, configurations of the apparatus or system are not necessarily limited to the above-described configurations. Alternatively, for example, the control unit 120 may be realized as a part of a single apparatus by being included in the radiation imaging apparatus 110. Conversely, the units of the radiation imaging apparatus 110 may be provided in a plurality of external apparatuses.

2. Flow of Image Processing

Figure 2:
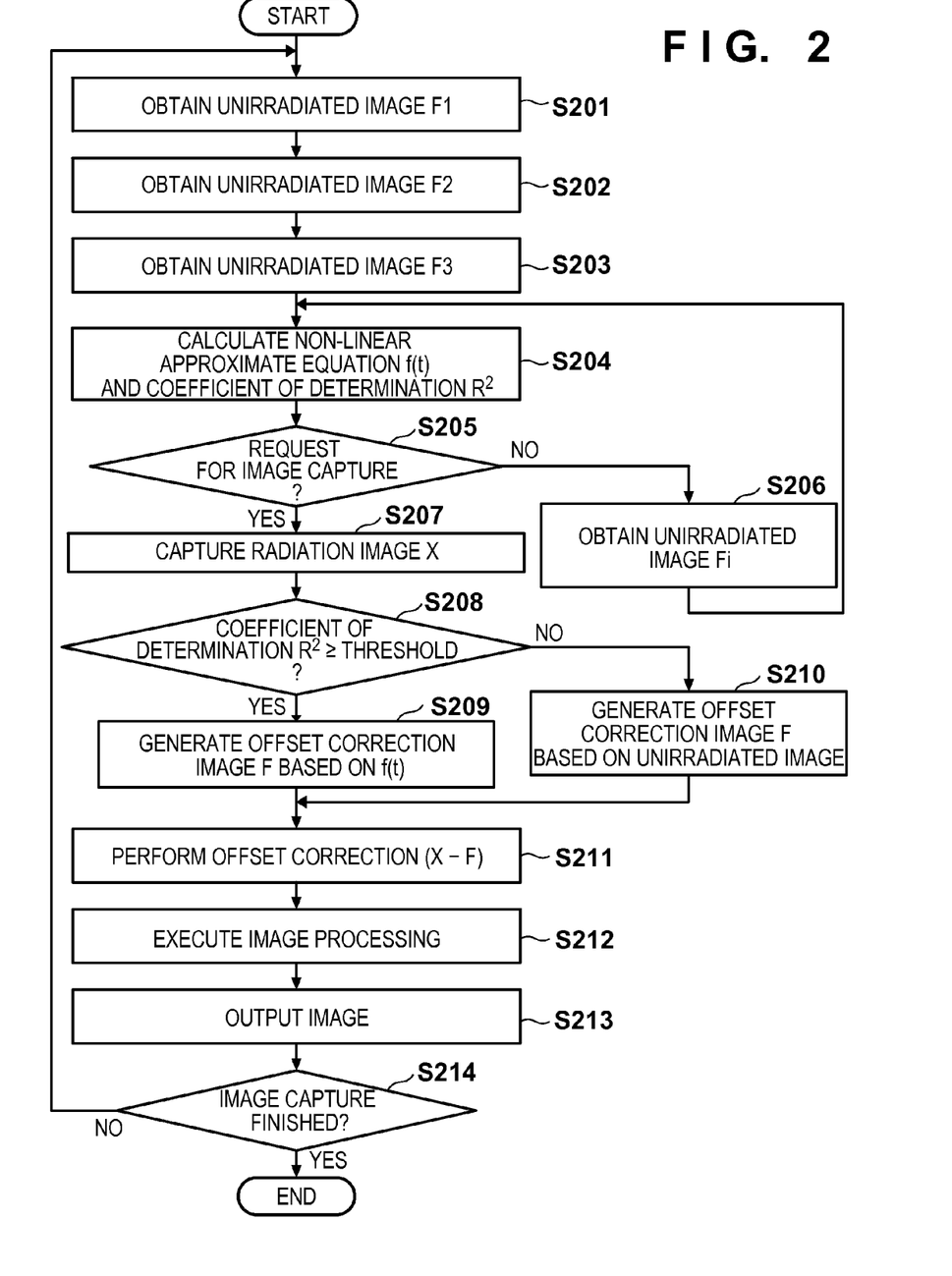
FIG. 2 is a flowchart showing one example of image processing executed by a radiation imaging apparatus.

A description is now given of a flow of image processing including the offset correction processing, which is a characteristic portion of the present invention, with reference to FIG. 2. FIG. 2 is a flowchart showing one example of image processing executed by the radiation imaging apparatus shown in FIG. 1.

Once the image processing is started, three unirradiated images are captured in succession (steps S201 to S203). Note that the interval at which the unirradiated images are obtained may be or may not be fixed. Also, the number of the obtained unirradiated images is not limited to three, and may be three or more.

After the three unirradiated images have been obtained in succession, an approximate equation (non-linear approximate equation) F(t) and a coefficient of determination $R^2$ of the approximate equation F(t) are calculated by fitting a temporal change in the amount of electric charges in the radiation detection elements constituting the image detection unit 111 using a non-linear function (step S204). Note that the approximate equation F(t) and $R^2$ are calculated with respect to all the radiation detection elements. Also, the non-linear function used in the approximation is not limited to a certain function as long as it is a model that shows a temporal change in residual electric charges. In particular, an exponential function, a logarithmic function, and the like can be suitably used. In the present embodiment, an approximate model using a logarithmic function, F(t)=A log(t)+B, is used to estimate A and B. Note that t denotes a time period beginning at the start of the driving or at the time of capturing an immediately preceding radiation image.

When a request for capturing a radiation image is made (step S205), radiation is emitted immediately to capture the radiation image (step S207). On the other hand, when the request for capturing the radiation image is not made, an unirradiated image is obtained again (step S206), and the approximate equation F(t) and the coefficient of determination $R^2$ are updated based on three latest unirradiated images (step S204).

After the radiation image has been captured (step S207), an offset correction image is generated continuously. In generating the offset correction image, the coefficient of determination $R^2$ obtained through the latest non-linear approximation is compared with a threshold (step S208). When the coefficient of determination $R^2$ is larger than or equal to the threshold, an offset correction image at the time of capturing the radiation image is generated by estimating pixel values of pixels at the time of capturing the radiation image based on the approximate equation F(t) (step S209). On the other hand, when the coefficient of determination $R^2$ is smaller than the threshold, the unirradiated image obtained last is used as an offset correction image (step S210).

The offset correction image obtained in step S209 or S210 is used in the offset correction processing for the radiation image (step S211). Specifics of processing for generating the offset correction image and the offset correction processing will be described later.

Various types of image processing are further applied to the radiation image to which the offset correction processing has been applied. Examples of such image processing applied to the radiation image include enhancement processing, dynamic range compression processing, noise reduction processing, and gradation processing. Various types of image processing are applied as needed (step S212). After such image processing has been applied to the radiation image, the image output unit 116 outputs the radiation image to the outside (step S213). For example, when the radiation image is output to the image display unit 130, the radiation image is displayed on the image display unit 130.

Thereafter, when the image capture is finished (the YES branch of step S214), the image processing is finished. When the image capture is not finished yet but is not performed within a certain time period (the NO branch of step S214), the processing returns to step S201 to start obtaining unirradiated images. Note that an instruction for finishing the image capture need not necessarily be based on an operation made by an operator. For example, an instruction for finishing the image capture may be automatically made when a predetermined image capture time period has elapsed.

3. Specifics of Processing for Generating Offset Correction Image

Figure 3:
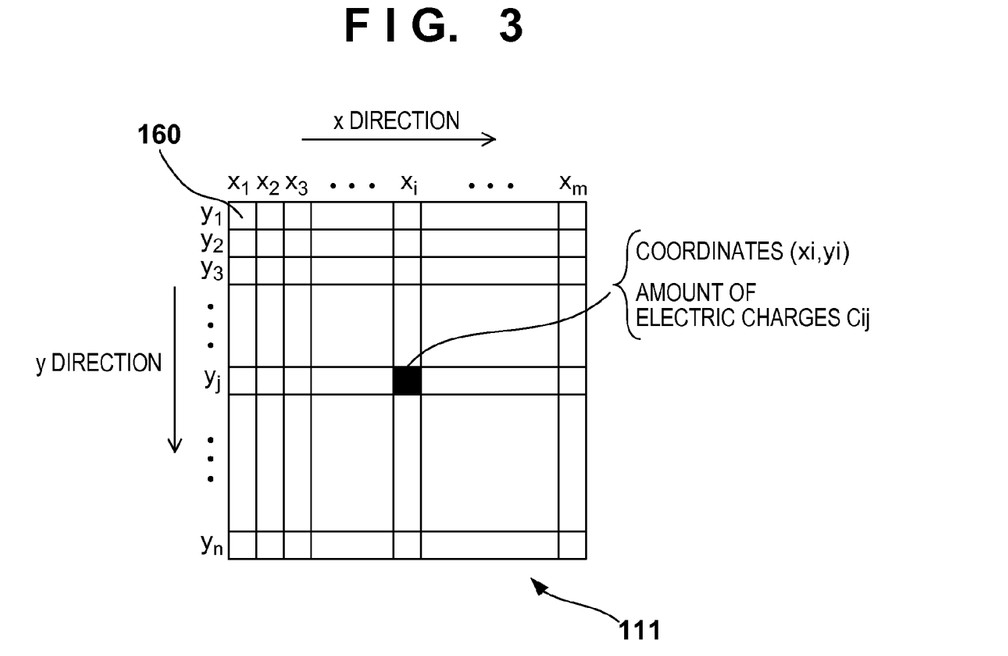
FIG. 3 is a schematic diagram showing one example of a configuration of an image detection unit.

The following describes the specifics of processing for generating an offset correction image, which is a characteristic portion of the present invention. FIG. 3 shows one example of arrangement of radiation detection elements 160 in the image detection unit 111. As shown in FIG. 3, in the image detection unit 111, radiation detection elements 160 are arrayed in an m×n matrix, that is to say, m radiation detection elements 160 and n radiation detection elements 160 are arrayed in the x direction and the y direction, respectively. When the image detection unit 111 is irradiated with emitted radiation for an arbitrary time period, electric charges corresponding to the dose of emitted radiation are generated and accumulated in each radiation detection element 160. The accumulated electric charges are read and output to the outside via a reading circuit, which is not shown in the figures. A radiation image is generated by converting the amounts C of electric charges in the radiation detection elements into luminance values of pixels. Hereinafter, the amount of electric charges accumulated in a radiation detection element at coordinates $(x_i, y_j)$ is expressed as $C_{ij}$.

Figure 4:
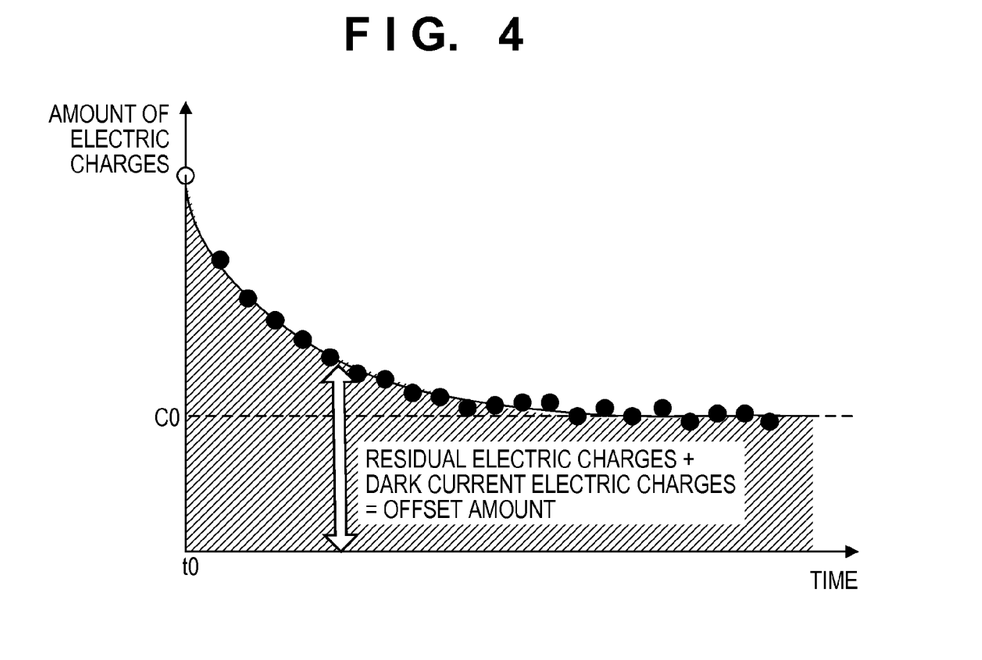
FIG. 4 is a schematic diagram showing a temporal change in the amount of electric charges after capturing a radiation image.

FIG. 4 is a graph showing a temporal change in the amount of electric charges (signal intensity) in radiation detection elements that were irradiated with radiation at time t0. A white marker represents the amount of electric charges for a radiation image that was captured at time t0, and black markers each represent the amount of electric charges for an unirradiated image that was obtained while accumulating the electric charges without emitting radiation (during an unirradiated time period). The amount of electric charges for an unirradiated image is a sum of the amount of residual electric charges attributed to radiation emitted at time t0 and the amount of dark current electric charges, and is equivalent to an offset amount for a radiation image to be captured next.

When capturing a radiation image continuously, the net amount of electric charges generated by the emission of radiation can be calculated by subtracting this offset amount from the obtained radiation image. This processing for subtracting an offset correction image from a radiation image is referred to as offset correction processing.

As shown in FIG. 4, immediately after capturing a radiation image, the offset amount has a large value because residual electric charges exist in the radiation detection elements. However, as residual electric charges decrease monotonically over time, once a certain time period has elapsed, the offset amount converges to a certain range based on C0. Note that C0 represents the amount of electric charges attributed to dark current electric charges accumulated during a time period for obtaining unirradiated images, and takes a random value in a certain range depending on external factors such as variation in the characteristics of the radiation detection elements and temperature.

In order to improve the correction accuracy of the offset correction processing for a radiation image, an offset correction image, that is to say, an unirradiated image should be obtained at the same timing as the radiation image. However, as it is impossible to obtain a radiation image and an unirradiated image simultaneously, an unirradiated image that is obtained immediately before or immediately after capturing a radiation image is commonly used as an offset correction image. Meanwhile, when a large amount of residual electric charges exists, especially immediately after the emission of radiation, a temporal change in the amount of electric charges is large, and therefore the correction accuracy of the offset correction processing decreases. Therefore, in general, the next radiation image cannot be captured until the residual electric charges decrease substantially to a certain value.

Figure 5:
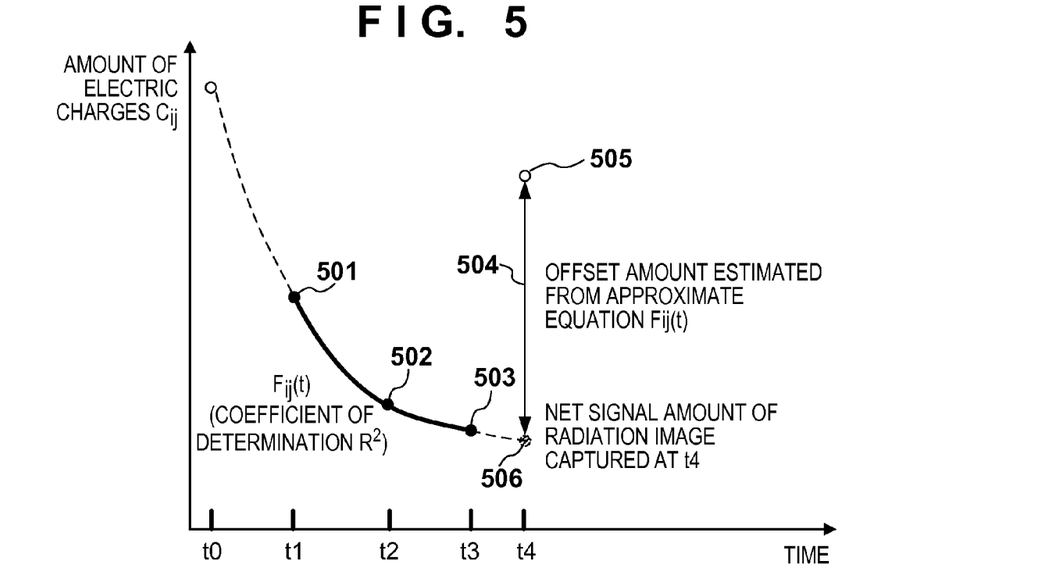
FIG. 5 is a diagram for explaining a method of offset correction processing.

On the other hand, in the present embodiment, the offset correction processing is executed by estimating an offset amount from three unirradiated images obtained before capturing a radiation image. FIG. 5 is a schematic diagram for explaining a method for generating an offset correction image in the present embodiment. FIG. 5 shows a temporal change in the amount of electric charges $C_{ij}$ in a pixel at coordinates $(x_i, y_j)$ between time t0 at which a radiation image is captured and time t4 at which a radiation image is captured again.

After capturing a radiation image at t0, unirradiated images are continuously obtained at time t1, time t2 and time t3. An accumulation time period for obtaining each unirradiated image is $\Delta t$. Note that $\Delta t$ may be determined in combination with imaging conditions for an immediately preceding radiation image, or with other conditions. An approximate equation $F_{ij}(t)$ and a coefficient of determination $R^2$ of the approximation are calculated by approximating a temporal change in the offset amount with an approximate model using a logarithmic function based on the amounts of electric charges for the three unirradiated images obtained (501 to 503).

When the next radiation image is captured at time t4, provided that an accumulation time period for the next radiation image is also $\Delta t$ as with the unirradiated images, an offset amount 504 at time t4 can be estimated by extrapolating $F_{ij}(t)$ for time t4. Hence, the net amount of electric charges 506 for the captured radiation image can be calculated with high accuracy by subtracting the estimated offset amount 504 from the amount of electric charges 505 for the captured radiation image.

While the interval at which the three unirradiated images are obtained is arbitrary and need not be fixed, making the interval of obtainment of the three unirradiated images as short as possible allows capturing the next radiation image as quickly as possible after starting the driving or after capturing an immediately preceding radiation image.

Also, the accuracy of estimation through extrapolation of the approximate equation decreases as the interval to which extrapolation is applied, i.e. a time period between t3 and t4 in FIG. 5, increases. For this reason, when a radiation image is not captured within a certain time period after obtaining the last unirradiated image, one unirradiated image is newly obtained (t5) and the approximate equation is updated based on three unirradiated images including the latest unirradiated image.

When an accumulation time period for obtaining each unirradiated image differs from an accumulation time period for capturing a radiation image, the offset correction image cannot be obtained with high accuracy simply by extrapolating $F_{ij}(t)$ for t4. The offset correction processing is based on the premise that an accumulation time period for obtaining a radiation image is the same as an accumulation time period for obtaining an offset correction image. Should the offset correction processing be executed based on an offset correction image obtained under different imaging conditions, the correction accuracy decreases significantly.

In general, an accumulation time period for capturing a radiation image varies in length depending on an imaging technique, a portion to be imaged, a body position for imaging, conditions for emitting radiation, the size of an object to be imaged, and the like. Therefore, an accumulation time period for capturing a radiation image is often different from conditions for obtaining unirradiated images that were obtained in advance and used to generate an offset correction image.

Accordingly, in the present embodiment, when an accumulation time period for obtaining a radiation image differs from an accumulation time period for obtaining an offset correction image, the approximate equation F(t) is integrated over a time period for obtaining the radiation image. In this way, a highly accurate offset correction image is generated.

Figure 6:
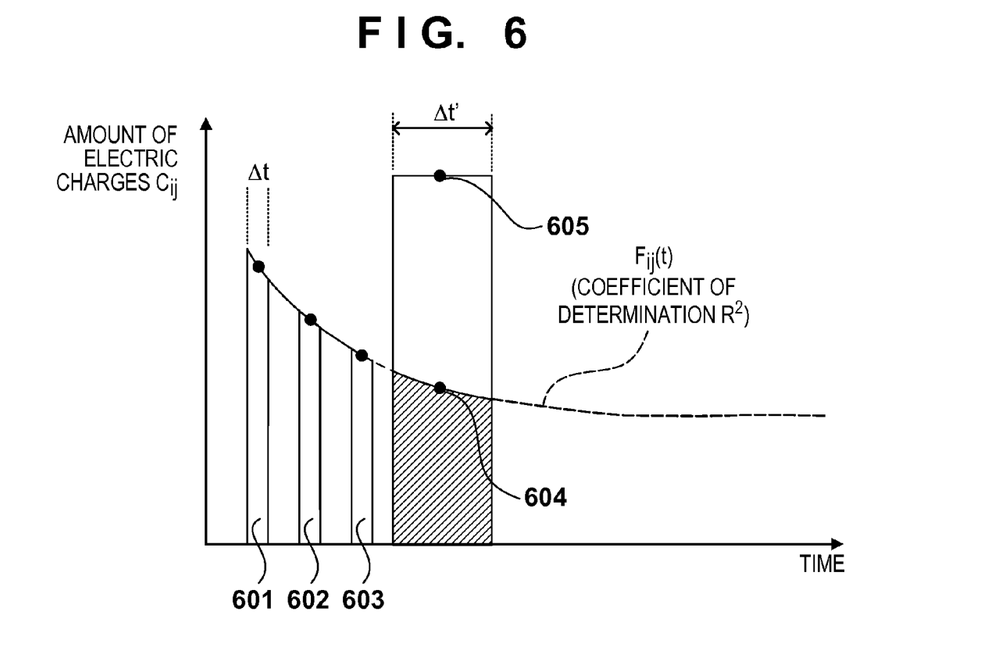
FIG. 6 is a diagram for explaining a method of offset correction processing for the case where an accumulation time period for unirradiated images differs from an accumulation time period for a radiation image.

FIG. 6 is a schematic diagram for explaining processing executed by the correction image generation unit 114 when an accumulation time period for unirradiated images differs from an accumulation time period for a radiation image. FIG. 6 shows a temporal change in the amount of electric charges $C_{ij}$ for the case where a radiation image is obtained in an accumulation time period $\Delta t'$ continuously after three unirradiated images are obtained.

In the example of FIG. 6, a radiation image 605 is captured in the accumulation time period $\Delta t'$ after obtaining three unirradiated images (601 to 603) in an accumulation time period $\Delta t$, and the following relationship holds: $\Delta t < \Delta t'$. In this case, an offset amount 604 for the radiation image is calculated by integrating the approximate equation $F_{ij}(t)$ calculated from the three unirradiated images over the accumulation time period for the radiation image. The same goes for the case of $\Delta t > \Delta t'$.

As mentioned above, as residual electric charges decay over time, an offset amount converges to a certain range based on dark current electric charges. Once the offset amount has converged to the certain range, the offset amount starts to fluctuate randomly. Therefore, if the same approximate model used during the decay is continuously used, then the accuracy of approximation decreases, which results in a decrease in the correction accuracy of the offset correction processing. In view of this, the present embodiment determines whether or not the residual electric charges exist by evaluating the accuracy of approximation, and switches between methods for generating an offset correction image in accordance with the result of the determination.

The accuracy of approximation can be evaluated by checking a coefficient of determination $R^2$ which is used as a measure of how appropriate the result yielded by the approximate equation is. When a coefficient of determination of non-linear approximation is larger than a predetermined threshold, that is to say, when the accuracy of approximation is high, it means that the residual electric charges are dominant and an offset amount can be predicted through extrapolation using the obtained approximate equation. On the other hand, when the coefficient of determination is smaller than the predetermined threshold, it means that the residual electric charges have decreased sufficiently and random dark current electric charges are dominant; that is to say, simply using the approximate equation makes the correction accuracy low. In this case, the unirradiated image obtained immediately before capturing the radiation image, i.e. the unirradiated image obtained last should be used in the offset correction processing. Alternatively, the average value of the three latest unirradiated images may be used in the offset correction processing. When an accumulation time period for obtaining a radiation image differs from an accumulation time period for obtaining unirradiated images, an offset amount can be calculated by multiplying pixel values of the unirradiated images by a ratio between the accumulation time periods, i.e. $\Delta t'/\Delta t$, which serves as a coefficient.

A threshold for the coefficient of determination $R^2$, which is a criterion for switching between methods of the offset correction processing, is preferably set to 0.6 or larger, more preferably set to a range of 0.6 to 0.8, and even more preferably set to a range of 0.75 to 0.8.

Residual electric charges depend on the dose of radiation that was last emitted, and the decay thereof depends on the characteristics of the radiation detection elements. Similarly, dark current depends on the characteristics of the radiation detection elements, and takes various values depending on the temperature, deterioration of the elements, and the like. Therefore, in order to generate a highly accurate offset correction image, it is preferable to perform approximation with respect to all pixels. It should be noted, however, that the accuracy of approximation may be checked using the coefficient of determination based on the average value of all pixels or on the average value of pixels included in a region arbitrarily extracted.

Furthermore, the interval at which unirradiated images are obtained for updating the approximate equation may be controlled depending on the coefficient of determination. More specifically, when the coefficient of determination is larger than or equal to a threshold, it means that the amount of electric charges keeps decreasing, and therefore it is preferable to obtain the unirradiated images at a short interval. On the other hand, when the coefficient of determination is smaller than the threshold, it means that the amount of electric charges has already converged substantially to a certain range, and therefore it is preferable to extend the interval at which the unirradiated images are obtained. In this way, power consumption and deterioration of the radiation detection elements can be suppressed.

As described above, the present embodiment can improve the image quality of a radiation image by using an approximate equation based on three or more unirradiated images that are obtained after starting the driving of the image detection unit or after capturing a radiation image. Furthermore, the present embodiment can improve the operability of the radiation imaging apparatus by determining whether or not the residual electric charges exist through evaluation of a coefficient of determination of an approximate equation for each pixel and by generating the most appropriate offset correction image for each pixel.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-132366 filed Jun. 11, 2012, which is hereby incorporated by reference herein in its entirety.

What is claimed is:

1. A radiation image processing apparatus comprising:
an obtaining unit configured to obtain a radiation image signal and electrical signals, the radiation image signal being read during a first radiation imaging from a radiation detector including a plurality of pixels, and the electrical signals being read in succession from the radiation detector continuously after the reading of the radiation image signal and corresponding to accumulated electric charges of the plurality of pixels;
a determination unit configured to determine whether or not to correct another radiation image signal read from the radiation detector during a second radiation imaging that is performed continuously after the reading of the electrical signals based on a temporal change in the obtained electrical signals; and
a correction unit configured to correct said another radiation image signal based on a result of the determination and dark current data which is obtained after the first radiation imaging based on the temporal charge in the obtained electrical signals.

2. The radiation image processing apparatus according to claim 1, wherein
when the determination unit determines that the correction is to be made based on the temporal change, said another radiation image signal is corrected based on the temporal change, and
when the determination unit determines that the correction is not to be made based on the temporal change, said another radiation image signal is corrected based on dark current data obtained before the second radiation imaging.

3. A radiation imaging apparatus including an image detection unit and an image processing unit, the image detection unit including a plurality of radiation detection elements that generate electric charges in accordance with a dose of radiation transmitted through an object, and the image processing unit processing a radiation image detected by the image detection unit,
wherein the image processing unit includes:

a correction image generation unit configured to generate, based on a plurality of unirradiated images that are obtained in succession by the image detection unit while radiation is not emitted, a correction image for a radiation image that is obtained at an arbitrary timing after the plurality of unirradiated images are obtained; and a correction unit configured to correct the radiation image using the correction image, wherein the correction image generation unit applies non-linear approximation to a temporal change in signal intensities of the plurality of unirradiated images in units of the plurality of radiation detection elements, and switches between methods for generating a correction image in accordance with a coefficient of determination of an obtained approximate equation.

4. The radiation imaging apparatus according to claim 3, wherein the number of unirradiated images used in generation of the correction image is at least three.

5. The radiation imaging apparatus according to claim 3, wherein the correction image generation unit generates the correction image using the approximate equation when the coefficient of determination is larger than or equal to a threshold, and generates the correction image using an unirradiated image that immediately precedes obtainment of the radiation image when the coefficient of determination is smaller than the threshold.

6. The radiation imaging apparatus according to claim 5, wherein when an accumulation time period for obtaining the plurality of unirradiated images differs from an accumulation time period for obtaining the radiation image and the coefficient of determination of the approximate equation is larger than or equal to the threshold, the correction image generation unit generates the correction image by integrating the approximate equation in accordance with the accumulation time period for obtaining the radiation image.

7. The radiation imaging apparatus according to claim 5, wherein when an accumulation time period for obtaining the plurality of unirradiated images differs from an accumulation time period for obtaining the radiation image and the coefficient of determination of the approximate equation is smaller than the threshold, the correction image generation unit generates the correction image by multiplying the unirradiated image that immediately precedes obtainment of the radiation image by a ratio between the accumulation time periods.

8. The radiation imaging apparatus according to claim 5, wherein the threshold for the coefficient of determination is 0.6 or larger.

9. The radiation imaging apparatus according to claim 3, wherein the non-linear approximation is approximation using a logarithmic function.

10. The radiation imaging apparatus according to claim 3, wherein the non-linear approximation is applied to all of the plurality of radiation detection elements.

11. The radiation imaging apparatus according to claim 3, wherein when a radiation image is not captured within a predetermined time period after obtaining a last unirradiated image, the approximate equation and the coefficient of determination are updated by obtaining an unirradiated image again and reapplying the non-linear approximation.

12. The radiation imaging apparatus according to claim 3, wherein an interval at which the plurality of unirradiated images are obtained is changed in accordance with the coefficient of determination.

13. An image processing method for a radiation image processing apparatus, the method comprising:

an obtaining step of obtaining a radiation image signal and electrical signals, the radiation image signal being read during a first radiation imaging from a radiation detector including a plurality of pixels, and the electrical signals being read in succession from the radiation detector continuously after the reading of the radiation image signal and corresponding to accumulated electric charges of the plurality of pixels;

a determination step of determining whether or not to correct another radiation image signal read from the radiation detector during a second radiation imaging that is performed continuously after the reading of the electrical signals based on a temporal change in the obtained electrical signals; and a correction step of correcting said another radiation image signal based on a result of the determination and dark current data which is obtained after the first radiation imaging based on the temporal charge in the obtained electrical signals.

14. An image processing method for a radiation imaging apparatus including an image detection unit and an image processing unit, the image detection unit including a plurality of radiation detection elements that generate electric charges in accordance with a dose of radiation transmitted through an object, and the image processing unit processing a radiation image detected by the image detection unit, the method comprising:

a correction image generation step of generating, based on a plurality of unirradiated images that are obtained in succession by the image detection unit while radiation is not emitted, a correction image for a radiation image that is obtained at an arbitrary timing after the plurality of unirradiated images are obtained; and a correction step of correcting the radiation image using the correction image, wherein the correction image generation step applies non-linear approximation to a temporal change in signal intensities of the plurality of unirradiated images in units of the plurality of radiation detection elements, and switches between methods for generating a correction image in accordance with a coefficient of determination of an obtained approximate equation.

15. A non-transitory computer readable storage medium storing a program for causing a computer to function as the units of the radiation image processing apparatus according to claim 1.

16. A non-transitory computer readable storage medium storing a program for causing a computer to function as the units of the radiation imaging apparatus according to claim 3.

* * * * *